US011755247B2

(12) United States Patent
Jeong et al.

(10) Patent No.: US 11,755,247 B2
(45) Date of Patent: Sep. 12, 2023

(54) STORAGE DEVICE AND OPERATING METHOD THEREOF

(71) Applicant: SK hynix Inc., Icheon-si (KR)

(72) Inventors: Jae Hyeong Jeong, Icheon-si (KR); Dae Sung Kim, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/558,058

(22) Filed: Dec. 21, 2021

(65) Prior Publication Data

US 2022/0413764 A1 Dec. 29, 2022

(30) Foreign Application Priority Data

Jun. 28, 2021 (KR) ........................ 10-2021-0084269

(51) Int. Cl.
*G06F 3/06* (2006.01)

(52) U.S. Cl.
CPC .......... *G06F 3/0659* (2013.01); *G06F 3/0604* (2013.01); *G06F 3/0634* (2013.01); *G06F 3/0683* (2013.01)

(58) Field of Classification Search
CPC .... G06F 3/0659; G06F 3/0604; G06F 3/0634; G06F 3/0683; G06F 3/0635; G06F 3/0658; G06F 2212/1024; G06F 2212/1028; G06F 2212/7203; G06F 2212/7206; G06F 2212/7208; G06F 13/16; G06F 12/0246; G06F 12/0292; G06F 1/3203; G06F 1/32; G06F 1/3234; G06F 1/26; G11C 5/14; G11C 5/144
See application file for complete search history.

(56) References Cited

U.S. PATENT DOCUMENTS

2017/0177217 A1* 6/2017 Kanno .................. G06F 3/0625

FOREIGN PATENT DOCUMENTS

| KR | 101573723 B1 | 12/2015 |
| KR | 101735142 B1 | 5/2017 |

OTHER PUBLICATIONS

H. Kawata, G. Nakagawa, T. Hirofuchi, R. Takano and S. Oikawa, "Modeling Energy Consumption of Memory Systems," 2015 Third International Symposium on Computing and Networking (CANDAR), Sapporo, Japan, 2015, pp. 601-603, doi: 10.1109/CANDAR.2015. 31. (Year: 2015).*

* cited by examiner

Primary Examiner — Khoa D Doan
(74) Attorney, Agent, or Firm — Perkins Coie LLP

(57) ABSTRACT

A storage device may include a plurality of memory devices and a memory controller in communication with the plurality of memory devices through a plurality of channels. The memory controller may select candidate channels to be activated among the plurality of channels, determine a threshold number of channel activation based on a number of channels in an active state before a first time point, and activate one or more target channels among the candidate channels so that a number of the target channels to be activated at the first time point is within the threshold number.

20 Claims, 13 Drawing Sheets

STORAGE DEVICE AND OPERATING METHOD THEREOF

CROSS-REFERENCE TO RELATED APPLICATION

This patent document claims priority to and benefits of the Korean patent application number 10-2021-0084269, filed on Jun. 28, 2021, which is incorporated herein by reference in its entirety.

TECHNICAL FIELD

The technology and implementations disclosed in this patent document relate to an electronic device, and more particularly, to a storage device and an operating method thereof.

BACKGROUND

Storage devices refer to electronic components that are configured to store data based on a control of a host device such as a computer or a smart phone. The storage device may include a memory device for storing data and a memory controller for controlling the memory device. The memory device is classified into a volatile memory device and a nonvolatile memory device depending on its capability to hold stored data in the absence of power.

A volatile memory device may store data only when power is supplied. Thus, such a volatile memory device loses its data in the absence of power. Examples of the volatile memory device include a Static Random Access Memory (SRAM), or a Dynamic Random Access Memory (DRAM).

A nonvolatile memory device is a memory device that can retain its data in the absence of power. Examples of the nonvolatile memory device include a Read Only Memory (ROM), a Programmable ROM (PROM), an Electrically Programmable ROM (EPROM), an Electrically Erasable ROM (EEROM), or a flash memory.

SUMMARY

Embodiments of the disclosed technology provide a storage device having improved control of a peak power period and an operating method of the storage device.

In accordance with an aspect of the disclosed technology, there is provided a storage device including a plurality of memory devices and a memory controller in communication with the plurality of memory devices through a plurality of channels. The memory controller may select candidate channels to be activated among the plurality of channels, determine a threshold number of channel activation based on a number of channels in an active state before a first time point, and activate one or more target channels among the candidate channels so that a number of the target channels to be activated at the first time point is within the threshold number.

In accordance with another aspect of the disclosed technology, there is provided a memory controller connected to a plurality of memory devices through a plurality of channels, the memory controller may include a storage and an operation controller. The storage may store a reference table including a channel activation threshold number that indicates a maximum number of channel activations occurring at a same time point and is set based on a number of channels in an active state. The operation controller may identify a first threshold number based on the reference table and a number of channels in the active state before a first time point, select, among the plurality of channels, candidate channels through which a command is to be transmitted among the plurality of channels, and activate, at the first time point, at least one target channel among the candidate channels, the number of the at least one target channel activated being within the first threshold number.

In accordance with still another aspect of the disclosed technology, there is provided a method for operating a memory controller connected to a plurality of memory devices through a plurality of channels, the method including: selecting candidate channels through which a command is to be transmitted among the plurality of channels; setting a first channel activation threshold number for a first time point based on a reference table including channel activation threshold numbers, each channel activation threshold number set based on a number of channels in an active state before a corresponding channel activation time point; and activating one or more target channels among the candidate channels at the first time point, a number of the one or more target channels being within the first channel activation threshold number.

BRIEF DESCRIPTION OF THE DRAWINGS

Example embodiments will now be described hereinafter with reference to the accompanying drawings

DETAILED DESCRIPTION

The specific structural or functional description disclosed herein is merely illustrative for describing examples of embodiments or implementations of the disclosed technology and should not be construed as limitations to the disclosed technology.

Figure 1:
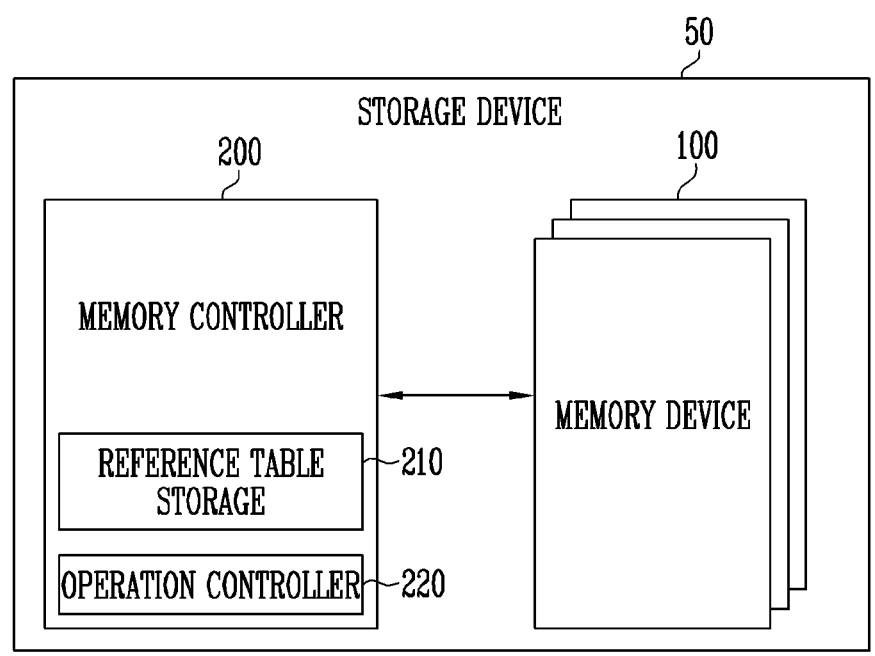
FIG. 1 is a diagram illustrating a storage device in accordance with an embodiment of the disclosed technology.

FIG. 1 is a diagram illustrating a storage device in accordance with an embodiment of the present disclosure.

Referring to FIG. 1, the storage device 50 is a device for storing data and may include a memory device 100 and a memory controller 200 that is coupled to control an access by a host and an operation of the memory device 100. The storage device 50 may be a device for storing data based on the control of a host, such as a mobile phone, a smart phone, an MP3 player, a laptop computer, a desktop computer, a game console, a TV, a tablet PC or an in-vehicle infotainment.

The storage device 50 may be manufactured as any one of various types of storage devices according to a host interface that is a communication scheme with the host. For example, the storage device 50 may be implemented with any one of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 50 may be manufactured as any one of various kinds of package types. For example, the storage device 50 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data. The memory device 100 operates based on the control of the memory controller 200. The memory device 100 may include a memory cell array including a plurality of memory cells for storing data.

Each of the memory cells may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

The memory cell array may include a plurality of memory blocks. Each memory block may include a plurality of memory cells. One memory block may include a plurality of pages. In an embodiment, the page may be a unit for storing data in the memory device 100 or reading data stored in the memory device 100.

The memory block may be a unit for erasing data. In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or others. In this specification, for convenience of description, a case where the memory device 100 is a NAND flash memory is assumed and described.

The memory device 100 receives a command and an address from the memory controller 200 and accesses an area selected by the address in the memory cell array. That is, the memory device 100 may perform an operation instructed by the command on the area selected by the address. For example, the memory device 100 may perform a write (program) operation, a read operation, and an erase operation. In the program operation, the memory device 100 may program data in the area selected by the address. In the read operation, the memory device 100 may read data from the area selected by the address. In the erase operation, the memory device 100 may erase data stored in the area selected by the address.

The memory controller 200 may control overall operations of the storage device 50.

When power is applied to the storage device 50, the memory controller 200 may execute firmware (FW). When the memory device 100 is a flash memory device, the memory controller 200 may execute FW such as a Flash Translation Layer (FTL) for controlling communication between the host and the memory device 100.

In an embodiment, the memory controller 200 may receive data and a Logical Block Address (LBA) from the host, and translate the LBA into a Physical Block Address (PBA) representing addresses of memory cells included in the memory device 100, in which data is to be stored.

The memory controller 200 may control the memory device 100 to perform a program operation, a read operation, an erase operation, or the like in response to a request from the host. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a command, an address, and data regardless of any request from the host, and transmit the command, the address, and the data to the memory device 100. For example, the memory controller 200 may provide the command, the address, and the data to the memory device 100 to perform background operations such as a program operation for wear leveling and a program operation for garbage collection.

In an embodiment, the memory controller 200 may control at least two memory devices 100. The memory controller 200 may control the memory devices according to an interleaving scheme so as to improve operational performance. The interleaving scheme may be an operating scheme that allows operation periods of at least two memory devices 100 to overlap with each other.

In an embodiment, the memory controller 200 may control a plurality of memory devices 100 through a plurality of channels. At least one memory device 100 may be connected to each channel. The memory controller 200 may transmit at least one of a command, an address, and data to the memory device 100 connected to the channel. The channel may be in an active state to actively transmit data between the memory controller 200 and the memory device 100, for example, when the memory controller 200 and the memory device 100 exchange a command, an address, data, and the like through the channel. Conversely, when the channel does not transmit data, the channel may be in an idle state. In general, the energy consumption of a channel is higher in an active state than in an idle state.

In an embodiment, the memory controller 200 may include a reference table storage 210 and an operation controller 220

The reference table storage 210 may store a reference table including a threshold number at a channel activation time point. At the channel activation time point, the channel enters into the active state from an idle state. The threshold number at the channel activation time point may be set based on a number of channels in the active state among the plurality of channels. In an embodiment, the threshold number at the channel activation time point may be differently changed based on at least one of a size of data processed according to a command and an operation frequency of the channel.

The operation controller 220 may determine a first threshold number, based on the reference table and a number of active channels that are in the active state before a first time point. The operation controller 220 may select candidate channels though which a command or data is to be transmitted among the plurality of channels. The operation controller 220 may activate, at the first time point, at least one target channel within the first threshold number among the candidate channels. The operation controller 220 may transmit a command, an address, data, and the like to a memory device connected to the at least one target channel.

In some implementations, the operation controller 220 may determine a second threshold number at a second time point that a predetermined delay elapses from the first time point, based on a number of channels that are in the active state before the second time point. The operation controller 220 may activate at least one channel except target channels among the candidate channels at the second time point. The number of the at least one target channel to be activated at the second time point is within the second threshold number.

The host may communicate with the storage device 50, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), or a Load Reduced DIMM (LRDIMM).

Figure 2:
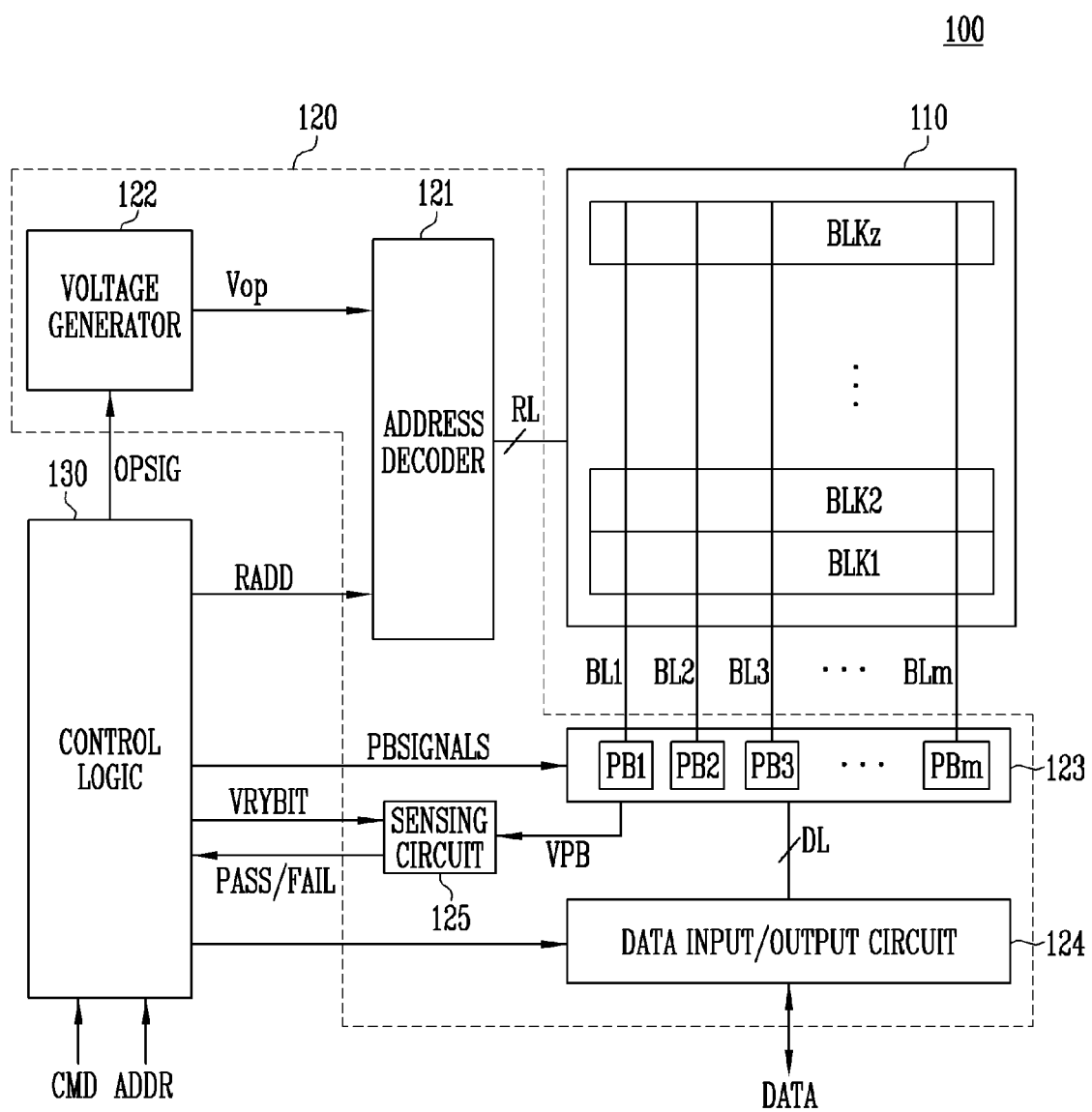
FIG. 2 is a diagram illustrating a structure of a memory device shown in FIG. 1.

FIG. 2 is a diagram illustrating a structure of a memory device shown in FIG. 1.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to an address decoder 121 through row lines RL. The plurality of memory blocks BLK1 to BLKz are connected to a read/write circuit 123 through bit lines BL1 to BLm. Each of the plurality of memory blocks BLK1 to BLKz includes a plurality of memory cells. In an embodiment, the plurality of memory cells may be nonvolatile memory cells. Memory cells connected to the same word line among the plurality of memory cells may be defined as one physical page. That is, the memory cell array 110 may be configured with a plurality of physical pages. In accordance with an embodiment of the present disclosure, each of the plurality of memory blocks BLK1 to BLKz included in the memory cell array 110 may include a plurality of dummy cells. One or more dummy cells may be connected in series between a drain select transistor and memory cells and between a source select transistor and the memory cells.

Each of the memory cells of the memory device 100 may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

The peripheral circuit 120 may include the address decoder 121, a voltage generator 122, the read/write circuit 123, a data input/output circuit 124, and a sensing circuit 125.

The peripheral circuit 120 drives the memory cell array 110. For example, the peripheral circuit 120 may drive the memory cell array 110 to perform a program operation, a read operation, and an erase operation.

The address decoder 121 is connected to the memory cell array 110 through the row lines RL. The row lines RL may include drain select lines, word lines, source select lines, and a common source line. In accordance with an embodiment of the present disclosure, the word lines may include normal word lines and dummy word lines. In accordance with an embodiment of the present disclosure, the row lines RL may further include a pipe select line.

The address decoder 121 may operate under the control of the control logic 130. The address decoder 121 receives an address ADDR from the control logic 130.

The address decoder 121 may decode a block address in the received address ADDR. The address decoder 121 selects at least one memory block among the memory blocks BLK1 to BLKz according to the decoded block address. The address decoder 121 may decode a row address in the received address ADDR. The address decoder 121 may select at least one word line among word lines of a memory block selected according to the decoded row address. The address decoder 121 may apply an operating voltage Vop supplied from the voltage generator 122 to the selected word line.

In a program operation, the address decoder 121 may apply a program voltage to the selected word line, and apply a pass voltage having a level lower than that of the program voltage to unselected word lines. In a program verify operation, the address decoder 121 may apply a verify voltage to the selected word line, and apply a verify pass voltage having a level higher than that of the verify voltage to the unselected word lines.

In a read operation, the address decoder 121 may apply a read voltage to the selected word line, and apply a read pass voltage having a level higher than that of the read voltage to the unselected word lines.

In accordance with an embodiment of the present disclosure, an erase operation of the memory device 100 is performed in units of memory blocks. In an erase operation, the address ADDR input to the memory device 100 includes a block address. The address decoder 121 may decode the block address and select at least one memory block according to the decoded block address. In the erase operation, the address decoder 121 may apply a ground voltage to word lines connected to the selected memory block.

In accordance with an embodiment of the present disclosure, the address decoder 121 may decode a column address in the address ADDR transmitted thereto. The decoded column address may be transmitted to the read/write circuit 123. In an example, the address decoder 121 may include components such as a row decoder, a column decoder, and an address buffer.

The voltage generator 122 may generate a plurality of operating voltages Vop by using an external power voltage supplied to the memory device 100. The voltage generator 122 operates under the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of operating voltages Vop by using the external power voltage or the internal power voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

In order to generate a plurality of operating voltages Vop having various voltage levels, the voltage generator 122 may include a plurality of pumping capacitors for receiving the internal power voltage, and generate the plurality of operating voltages Vop by selectively activating the plurality of pumping capacitors under the control of the control logic 130.

The plurality of generated operating voltages Vop may be supplied to the memory cell array 110 by the address decoder 121.

The read/write circuit 123 includes first to mth page buffers PB1 to PBm. The first to mth page buffers PB1 to PBm are connected to the memory cell array 110 through the respective first to mth bit lines BL1 to BLm. The first to mth page buffers PB1 to PBm operate under the control of the control logic 130.

The first to mth page buffers PB1 to PBm communicate data DATA with the data input/output circuit 124. In a program operation, the first to mth page buffers PB1 to PBm receive data DATA to be stored through the data input/output circuit 124 and data lines DL.

In a program operation, the first to mth page buffers PB1 to PBm may transfer, to selected memory cells through the bit lines BL1 to BLm, data DATA received through the data input/output circuit 124 when a program pulse is applied to a selected word line. The memory cells of the selected memory cells are programmed according to the transferred data DATA. A memory cell connected to a bit line through which a program allow voltage (e.g., a ground voltage) is applied may have an increased threshold voltage. A threshold voltage of a memory cell connected to a bit line through which a program inhibit voltage (e.g., a power voltage) is applied may be maintained. In a program verify operation, the first to mth page buffers PB1 to PBm read data DATA stored in the selected memory cells from the selected memory cells through the bit lines BL1 to BLm.

In a read operation, the read/write circuit 123 may read data DATA from memory cells of a selected page through the bit lines BL, and store the read data DATA in the first to mth page buffers PB1 to PBm.

In an erase operation, the read/write circuit 123 may float the bit lines BL. In an embodiment, the read/write circuit 123 may include a column select circuit.

The data input/output circuit 124 is connected to the first to mth page buffers PB1 to PBm through the data lines DL. The data input/output circuit 124 operates under the control of the control logic 130.

The data input/output circuit 124 may include a plurality of input/output buffers (not shown) that receive input data DATA. In a program operation, the data input/output circuit 124 may receive data DATA to be stored from an external controller (not shown). In a read operation, the data input/output circuit 124 outputs, to the external controller, data transmitted from the first to mth page buffers PB1 to PBm included in the read/write circuit 123.

In a read operation or verify operation, the sensing circuit 125 may generate a reference current in response to an allow bit VRYBIT signal generated by the control logic 130, and output a pass signal or fail signal to the control logic 130 by comparing a sensing voltage VPB received from the read/write circuit 123 and a reference voltage generated by the reference current.

The control logic 130 may be connected to the address decoder 121, the voltage generator 122, the read/write circuit 123, the data input/output circuit 124, and the sensing circuit 125. The control logic 130 may control overall operations of the memory device 100. The control logic 130 may operate in response to a command CMD transferred from an external device.

The control logic 130 may control the peripheral circuit 120 by generating several signals in response to a command CMD and an address ADDR. For example, the control logic 130 may generate an operation signal OPSIG, a row address RADD, a read/write circuit control signal PBSIGNALS, and an allow bit VRYBIT in response to the command CMD and the address ADDR. The control logic 130 may output the operation signal OPSIG to the voltage generator 122, output the row address RADD to the address decoder 121, output the read/write circuit control signal PBSIGNALS to the read/write circuit 123, and output the allow bit VRYBIT to the sensing circuit 125. Also, the control logic 130 may determine whether the verify operation has passed or failed in response to the pass or fail signal PASS/FAIL output by the sensing circuit 125.

Figure 3:
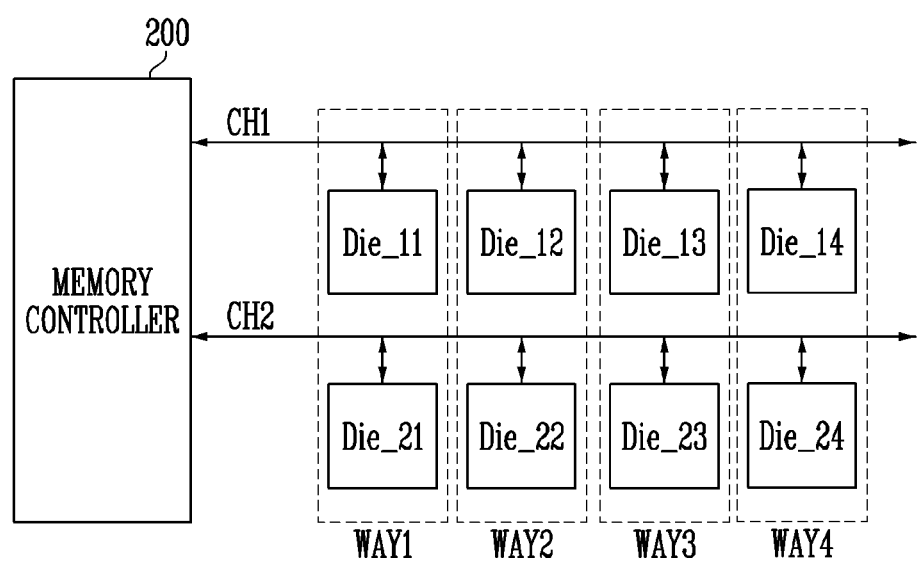
FIG. 3 is a diagram illustrating an operation of a memory controller for controlling a plurality of memory devices through a plurality of channels.

FIG. 3 is a diagram illustrating an operation of the memory controller for controlling a plurality of memory devices through a plurality of channels.

Referring to FIG. 3, the memory controller 200 may be connected to a plurality of memory devices memory device_11 to memory device_24 through a first channel CH1 and a second channel CH2. The number of channels or the number of memory devices connected to each channel is not limited to this embodiment.

A memory device_11 Die_11, a memory device_12 Die_12, a memory device_13 Die_13, and a memory device_14 Die_14 may be commonly connected to the first channel CH1. The memory device_11 Die_11, the memory device_12 Die_12, the memory device_13 Die_13, and the memory device_14 Die_14 may communicate with the memory controller 200 through the first channel CH1.

Since the memory device_11 Die_11, the memory device_12 Die_12, the memory device_13 Die_13, and the memory device_14 Die_14 are commonly connected to the first channel CH1, only one memory device can communicate with the memory controller 200. However, internal operations respectively performed by the memory device_11 Die_11, the memory device_12 Die_12, the memory device_13 Die_13, and the memory device_14 Die_14 may be simultaneously performed.

A memory device_21 Die_21, a memory device_22 Die_22, a memory device_23 Die_23, and a memory device_24 Die_24 may be commonly connected to the second channel CH2. The memory device_21 Die_21, the memory device_22 Die_22, the memory device_23 Die_23, and the memory device_24 Die_24 may communicate with the memory controller 200 through the second channel CH2.

Since the memory device_21 Die_21, the memory device_22 Die_22, the memory device_23 Die_23, and the memory device_24 Die_24 are commonly connected to the second channel CH2, only one memory device can communicate with the memory controller 200. However, internal operations respectively performed by the memory device_21 Die_21, the memory device_22 Die_22, the memory device_23 Die_23, and the memory device_24 Die_24 may be simultaneously performed.

The storage device using a plurality of memory devices may improve performance by using data interleaving as data communication using an interleaving scheme. The data interleaving may be that, in a structure in which two or more ways share one channel, a data read or write operation is performed while moving between the ways. In order to use the data interleaving, the memory devices may be managed in units of channels and ways. In order to maximize the parallelism of memory devices connected to each channel, the memory controller 200 may allocate a continuous logical memory area to be distributed to a channel and a way.

For example, the memory controller 200 may transmit a command, a control signal including an address, and data to the memory device_11 Die_11 through the first channel CH1. While the memory device_11 programs the transmitted data in a memory cell included therein, the memory controller 200 may transmit a command, a control signal including an address, and data to the memory device_12 Die_12.

In FIG. 3, the plurality of memory devices may be grouped into four ways WAY1 to WAY4. A first way WAY1 may include the memory device_11 Die_11 and the memory device_21 Die_21. A second way WAY2 may include the memory device_12 Die_12 and the memory device_22 Die_22. A third way WAY3 may include the memory device_13 Die_13 and the memory device_23 Die_23. A fourth way WAY4 may include the memory device_14 Die_14 and the memory device_24 Die_24.

Each of the channels CH1 and CH2 may be a bus for signals shared and used by memory devices connected to the corresponding channel.

Figure 4:
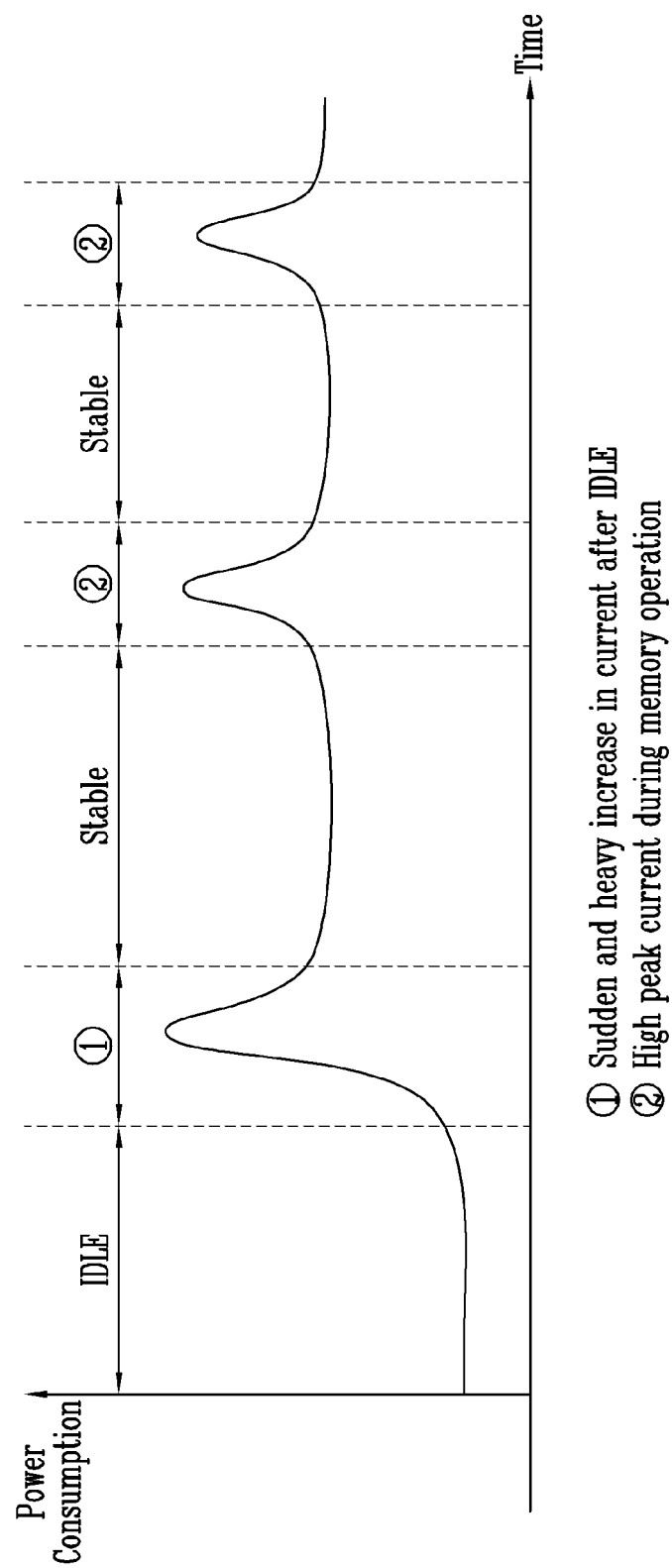
FIG. 4 is a diagram illustrating power consumption when a channel enters into an active state from an idle state.

FIG. 4 is a diagram illustrating power consumption over a channel when the channel enters into the active state for transmitting data from the idle state where no data transmission occurs over the channel.

Referring to FIG. 4, when a channel enters into the active state from the idle state, power consumption may suddenly increase and then maintain a stable state after the sudden increase. When the channel performs a memory operation, a high-level peak current may be generated, and the power consumption may increase.

The power consumption having such a pattern may become more severe as the number of channels connected to the memory controller increases and the number of memory devices connected to each channel increases.

In accordance with embodiments described with reference to FIGS. 6 and 7, the magnitude of peak power may be decreased by adjusting a number at a channel activation time point. The channel activation time point may refer to a point when a channel enters into the active state from the idle state.

Figure 5:
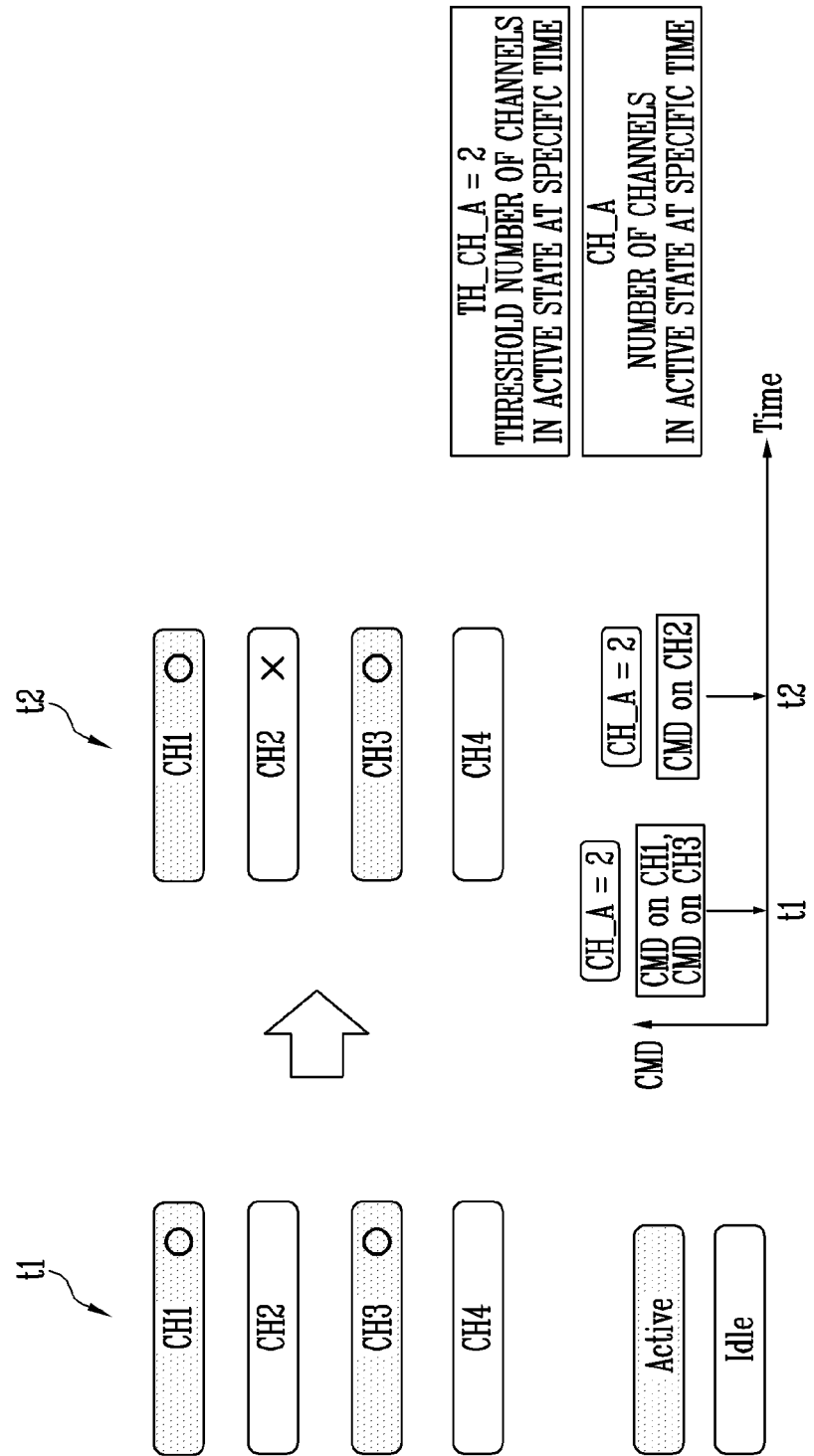
FIG. 5 is a diagram illustrating a method for adjusting a number of activated channels in accordance with an embodiment of the disclosed technology.

FIG. 5 is a diagram illustrating a method for adjusting a number of activated channels in accordance with an embodiment of the present disclosure.

Referring to FIG. 5, a channel threshold number TH_CH_A may be a maximum number of channels in the active state at a specific time point. In the example, the channel threshold number TH_CH_A may be 2. The channel threshold number TH_CH_A is not limited to 2 and can have a different value.

At t1, the memory controller may be scheduled to transmit a command to a memory device connected to a first channel and a memory device connected to a third channel. The first channel CH1 and the third channel CH3 may be candidate channels.

When the first channel CH1 and the third channel CH3 are activated at t1, a number of channels (CH_A) in the active state becomes 2. Since the number of channels (CH_A) in the active state, which is 2, is not greater than the channel threshold number TH_CH_A, which is 2, the memory controller may activate the first channel CH1 and the third channel CH3.

At t2, the memory controller may be scheduled to provide a command to at least one memory device connected to a second channel CH2. When the second channel CH2 is activated at t2, a number of channels (CH_A) in the active state becomes 3. Since the number of channels (CH_A) in the active state, which is 3, exceeds the channel threshold number TH_CH_A, which is 2, the memory controller cannot activate the second channel CH2.

The memory controller may transmit a command to at least one memory device connected to the second channel CH2 after at least one of the first channel CH1 and the third channel CH3 is inactivated.

Figure 6:
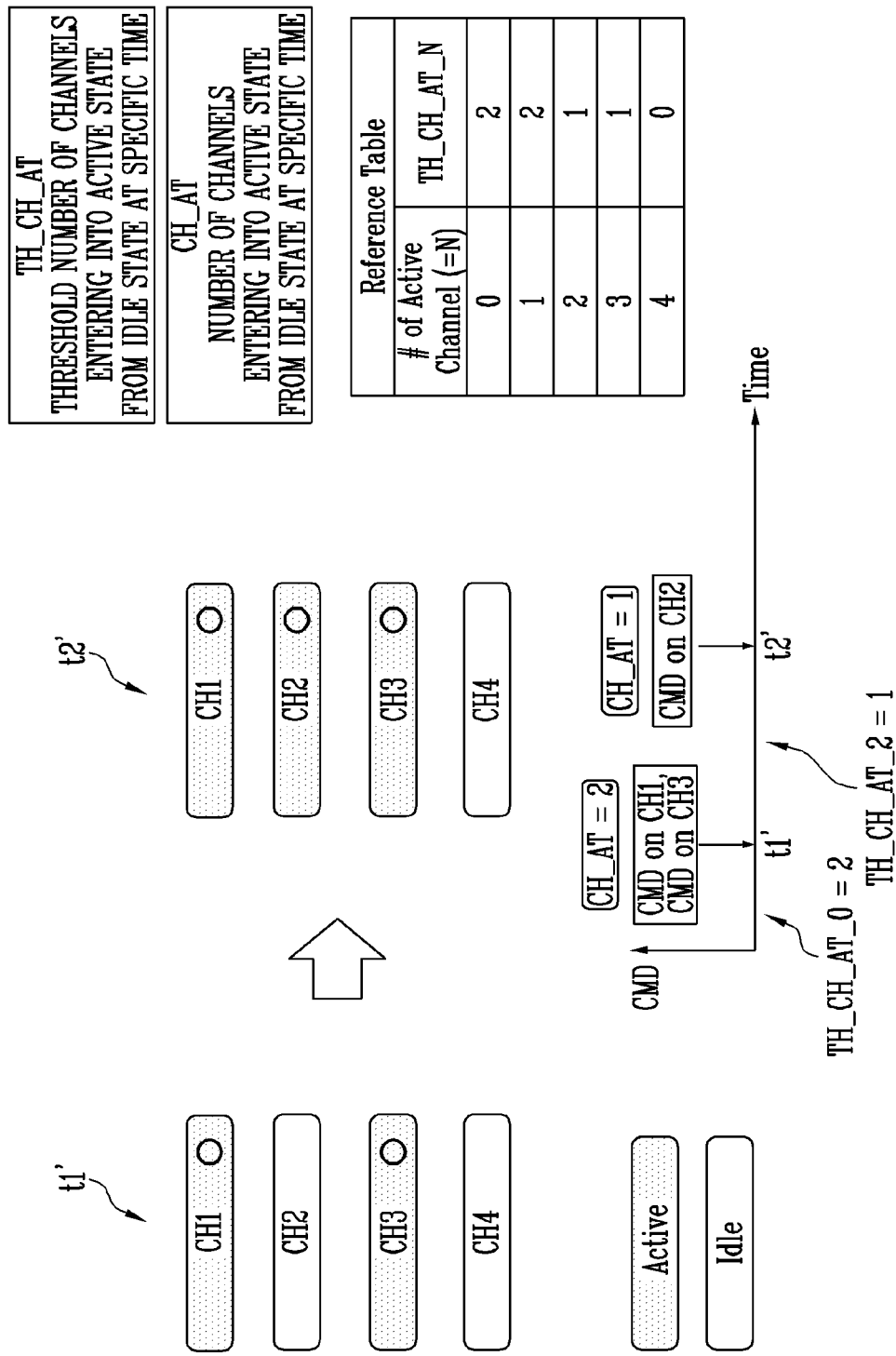
FIG. 6 is a diagram illustrating a method for adjusting a number of activated channels in accordance with an embodiment of the disclosed technology.

FIG. 6 is a diagram illustrating a method for adjusting a number of activated channels in accordance with an embodiment of the disclosed technology.

Referring to FIG. 6, a channel activation threshold number TH_CH_AT_N may be a maximum number of channel activations occurring at the channel activation time point. At the channel activation time point, a channel enters into the active state from the idle state. The channel activation threshold number TH_CH_AT_N may be determined based on a number of channels currently in the active state and a reference table. The example of the reference table is as shown in FIG. 6.

For example, referring to the reference table as shown in FIG. 6, when the number of channels in the active state is 0, the channel activation threshold number TH_CH_AT_0 at the channel activation time point may be 2. When the number of channels in the active state is 1, the channel activation threshold number TH_CH_AT_1 at the channel activation time point may be 2. When the number of channels in the active state is 2, the channel activation threshold number TH_CH_AT_2 at the channel activation time point may be 1. When the number of channels in the active state is 3, the channel activation threshold number TH_CH_AT_3 at the channel activation time point may be 1. When the number of channels in the active state is 4, the channel activation threshold number TH_CH_AT_4 at the channel activation time point may be 0.

The channel activation threshold numbers at the channel activation time, which are included in the reference table as shown in FIG. 6, are examples only and not limited thereto. In some implementations, multiple reference tables can be predetermined such that the channel activation threshold numbers at the channel activation time, which are included in each reference table, may be variously set based on at least one of a size of data processed according to a command and an operation frequency of a channel.

Referring back to FIG. 6, at t1', the memory controller may be scheduled to provide a command to at least one memory device connected to a first channel CH1 and at least one memory device connected to a third channel CH3.

When the first channel CH1 and the third channel CH3 enter into the active state from the idle state at t1', the number of channel activations occurring at t1' becomes 2.

Since the number of channels in the active state before t1' is 0, the channel activation threshold number TH_CH_AT_0 at t1' becomes 2. Since the number of channel activations, which is 2, is not greater than the channel activation threshold number TH_CH_AT_0, which is 2, the memory controller may activate the first channel CH1 and the third channel CH3.

When a second channel CH2 enters into the active state from the idle state at t2', the number of channel activations occurring at t2' becomes 1. Since the number of channels in the active state before t2' is 2, the channel activation threshold number TH_CH_AT_2 at t2' becomes 1. Since the number of channel activations, which is 1, is not greater than the channel activation threshold number TH_CH_AT_2, which is 1, the memory controller may activate the second channel CH2.

In accordance with the embodiment described in FIG. 6, as compared with the embodiment described in FIG. 5, due to the use of the number of channel activations occurring at the same time instead of the number of channels in the active state, a larger number of channels can be efficiently operated while decreasing a period in which peak power consumptions overlap with each other.

Figure 7:
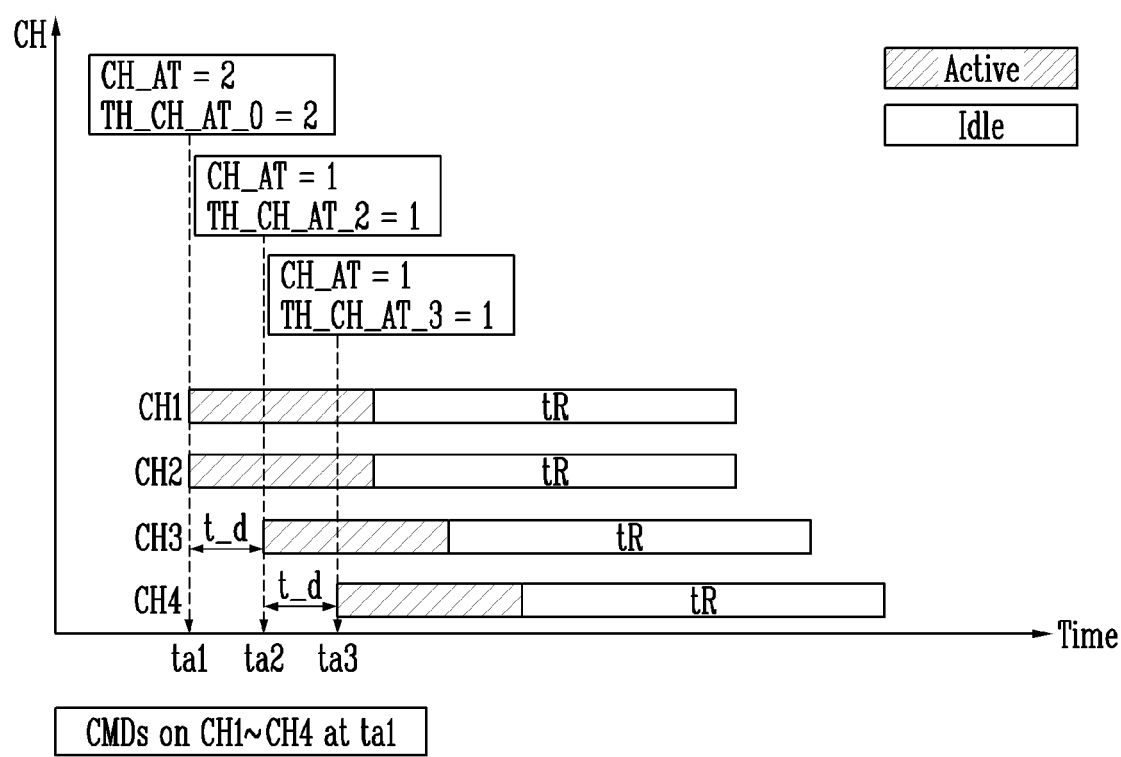
FIG. 7 is a diagram illustrating a method for adjusting a number of activated channels in accordance with an embodiment of the disclosed technology.

FIG. 7 is a diagram illustrating a method for adjusting a number of activated channels in accordance with an embodiment of the present disclosure.

Referring to FIG. 7, a number of channel activations (CH_AT) may be a number of times a channel enters into the active state from the idle state at the same time point.

A channel activation threshold number TH_CH_AT_N may be a maximum number of channel activation occurring at the same time point, which can be referred to as the channel activation time point.

At ta1, the memory controller may be scheduled to provide a command to a memory device connected to first to fourth channels CH1 to CH4. Therefore, the first to fourth channels CH1 to CH4 may be candidate channels which are to be activated at tat.

Since the number of channels in the active state before ta1 is 0, the channel activation threshold number TH_CH_AT_0 at the channel activation time point may be 2 according to the reference table as shown in FIG. 6.

Target channels among the candidate channels may be selected while satisfying that the number of channel activations (CH_AT)_at the channel activation time point is to be within the channel activation threshold number TH_CH_AT_0 at ta1. Thus, the target channels are selected such that the number of channel activations (CH_AT) at the channel activation time point is not greater than the channel activation threshold number TH_CA_AT_0 at ta1. In the examples below, the number of target channels selected among the candidate channels corresponds to the channel activation threshold number TH_CH_AT.

In FIG. 7, as the example, it is assumed that the first and second channels CH1 and CH2 are selected among the candidate channels CH1 to CH4. In some other examples, other channels than the first and second channels CH1 and CH2 can be selected as the target channels as long as the number of the target channels that are selected is within the channel activation threshold number TH_CA_AT_0.

ta2 may be a time point after a predetermined delay t_d elapses from ta1. Since the number of channels in the active state before ta2 is 2, the channel activation threshold number TH_CH_AT_2 at ta2 is 1 based on the reference table as shown in FIG. 6. Since the first and second channels CH1 and CH2 have been already activated at ta1, the third and fourth channels CH3 and CH4 are candidate channels at ta2 for the activation. Since the channel activation threshold number TH_CH_AT_2 at ta2 is 1, one channel among the third and fourth channels CH3 and CH4 may be activated. In the example, the third channel CH3 may be activated at ta2.

ta3 may be a time point after the predetermined delay t_d elapses from ta2. Since the number of channels in the active state before ta3 is 3, the channel activation threshold number TH_CH_AT_3 at the ta2 is 1 based on the reference table as shown in FIG. 6. Since the fourth channel CH4 is still inactive and the channel activation threshold number TH_CH_AT_3 at ta2 is 1, the fourth channel CH4 may be activated at ta3.

In an embodiment, whenever the channel is activated and the predetermined delay t_d elapses, the channel activation threshold number TH_CH_AT_N at the channel activation time may be updated based on a number of channels in the active state at a corresponding time point. Thus, the channel activation threshold number TH_CH_AT_N at the channel activation time can be adjusted according to the state of a current channel.

In accordance with the embodiment shown in FIG. 7, the number of channels in the active state at the same time point is not limited, but the number of channels entering into the active state from the idle state is limited, so that a larger number of channels can be operated while minimizing overlapping of peak power periods.

Figure 8:
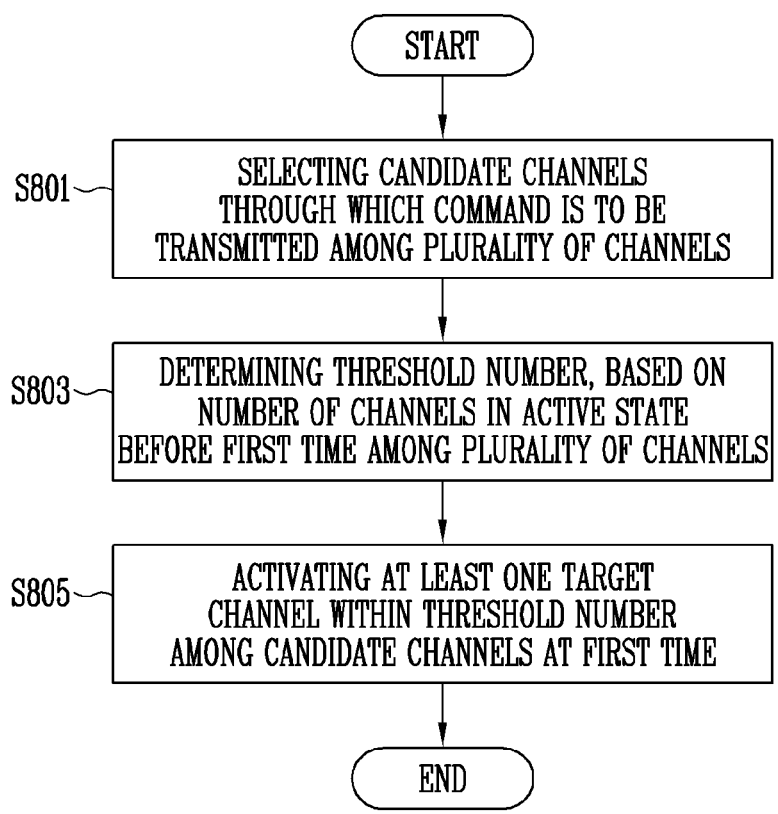
FIG. 8 is a flowchart illustrating an operation of the storage device in accordance with an embodiment of the disclosed technology.

FIG. 8 is a flowchart illustrating an operation of the storage device in accordance with an embodiment of the present disclosure.

Referring to FIG. 8, in step S801, the storage device may select, among a plurality of channels, candidate channels through which a command is to be transmitted.

In step S803, the storage device may determine a threshold number, based on a number of channels in the active state before a first time point among the plurality of channels. The first time point refers to a timing when the storage device activates at least one target channel.

In step S805, the storage device may activate the at least one target channel within the threshold number at the first time point. Thus, the number of the at least one target channel, which are activated, is not greater than the threshold number.

Figure 9:
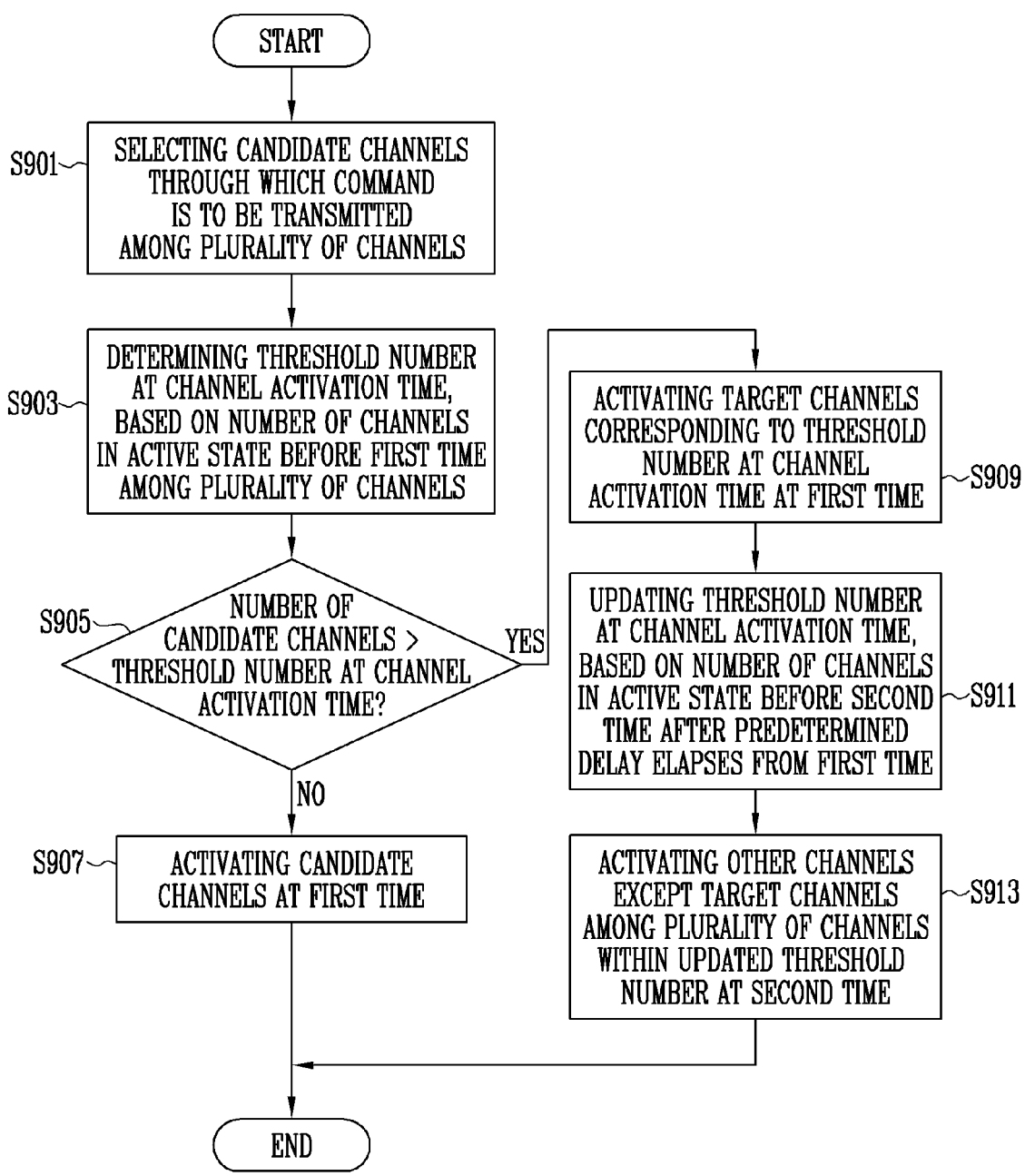
FIG. 9 is a flowchart illustrating an operation of the storage device in accordance with an embodiment of the disclosed technology.

FIG. 9 is a flowchart illustrating an operation of the storage device in accordance with an embodiment of the present disclosure.

Referring to FIG. 9, in step S901, the storage device may select, among a plurality of channels, candidate channels through which a command is to be transmitted.

In step S903, the storage device may determine a channel activation threshold number based on a number of channels in the active state before a first time point among the plurality of channels. The first time point refers to a timing when the storage device activates at least one target channel.

In step S905, the storage device may determine whether a number of the candidate channels is greater than the channel activation threshold number. When the number of the candidate channels is greater than the channel activation threshold number, the storage device proceeds to step S909. When the number of the candidate channels is smaller than or equal to the channel activation threshold number, the storage device proceeds to step S907.

In the step S907, the storage device may activate the candidate channels at the first time point. The storage device may provide the command to at least one memory device connected to the candidate channels at the first time point.

In the step S909, the storage device may activate target channels corresponding to the threshold number at the channel activation time at the first time point. The storage device may provide the command to at least one memory device connected to the target channels at the first time point.

In step S911, the storage device may update the channel activation threshold number, based on a number of channels in the active state at a second time point when a predetermined delay elapses from the first time point.

In step S913, the storage device may activate, at the second time point, other channels among the plurality of channels except the target channels. The number of other channels that are activated at the second time point is within the updated threshold number.

Figure 10:
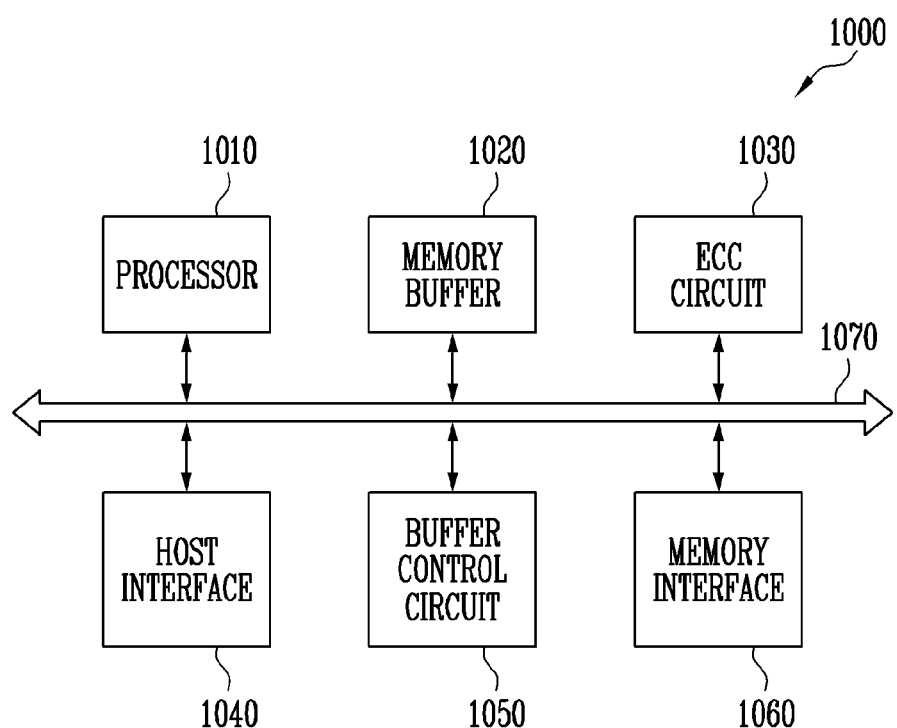
FIG. 10 is a diagram illustrating another embodiment of the memory controller shown in FIG. 1.

FIG. 10 is a diagram illustrating another embodiment of the memory controller shown in FIG. 1.

Referring to FIG. 10, a memory controller 1000 is connected to a host and a memory device. The memory controller 1000 may access the memory device in response to a request received from the host. For example, the memory controller 1000 may control write, read, erase, and background operations of the memory device. The memory controller 1000 may provide an interface between the memory device and the host. The memory controller 1000 may drive firmware for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between components of the memory controller 1000.

The processor 1010 may control overall operations of the memory controller 1000, and perform a logical operation. The processor 1010 may communicate with the external host through the host interface 1040, and communicate with the memory device through the memory interface 1060. Also, the processor 1010 may communicate with the memory buffer 1020 through the buffer control circuit 1050. The processor 1010 may control an operation of the storage device, using the memory buffer 1020 as a working memory, a cache memory or a buffer memory.

The processor 1010 may perform a function of a flash translation layer (FTL). The processor 1010 may translate a logical block address (LBA) provided by the host through the FTL into a physical block address (PBA). The FTL may receive an LBA, using a mapping table, to translate the LBA into a PBA. Several address mapping methods of the FTL exist according to mapping units. A representative address mapping method includes a page mapping method, a block mapping method, and a hybrid mapping method.

The processor 1010 may randomize data received from the host. For example, the processor 1010 may randomize data received from the host, using a randomizing seed. The randomized data is provided as data to be stored to the memory device to be programmed in the memory cell array.

In a read operation, the processor 1010 may derandomize data received from the memory device. For example, the processor 1010 may derandomize data received from the memory device, using a derandomizing seed. The derandomized data may be output to the host.

In an embodiment, the processor 1010 may perform randomizing and derandomizing by driving software or firmware.

The memory buffer 1020 may be used as the working memory, the cache memory, or the buffer memory of the processor 1010. The memory buffer 1020 may store codes and commands, which are executed by the processor 1010. The memory buffer 1020 may include a Static RAM (SRAM) or a Dynamic RAM (DRAM).

The ECC circuit 1030 may perform an ECC operation. The ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. The host interface 1040 may communicate with the host, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a NonVolatile Memory Express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

In an example, the memory controller 1000 may not include the memory buffer 1020 and the buffer control circuit 1050.

In an example, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

In an example, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, and may not interfere or influence with each other. The data bus may be connected to the host interface 1040, the buffer control circuit 1050, the ECC circuit 1030, and the memory interface 1060. The control bus may be connected to the host interface 1040, the processor 1010, the buffer control circuit 1050, the memory buffer 1020, and the memory interface 1060.

Figure 11:
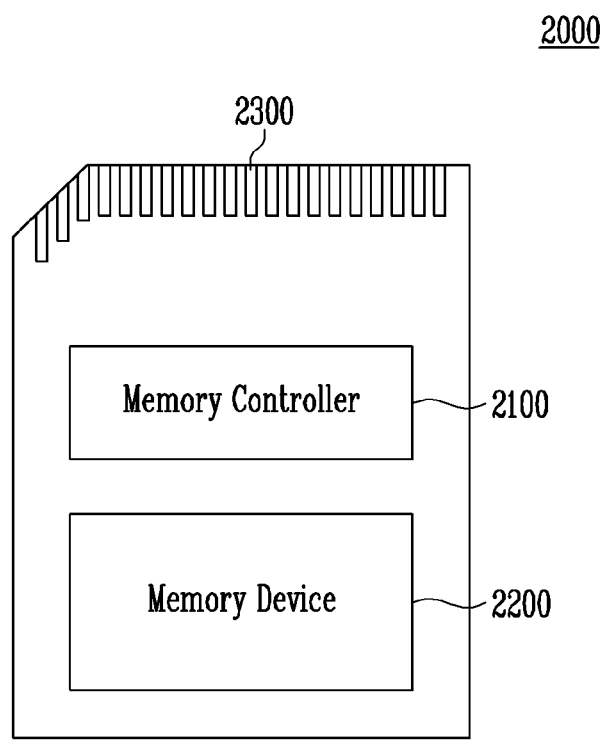
FIG. 11 is a block diagram illustrating a memory card system to which the storage device is applied in accordance with an embodiment of the disclosed technology.

FIG. 11 is a block diagram illustrating a memory card system to which the storage device is applied in accordance with an embodiment of the present disclosure.

Referring to FIG. 11, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1.

Exemplarily, the memory controller 2100 may include components such as a Random Access Memory (RAM), a processing unit, a host interface, a memory interface, and the error corrector.

The memory controller 2100 may communicate with an external device through the connector 2300. The memory controller 2100 may communicate with the external device (e.g., the host) according to a specific communication protocol. Exemplarily, the memory controller 2100 may communicate with the external device through at least one of various communication protocols such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

Exemplarily, the memory device 2200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2100 and the memory device 2200 may be integrated into a single semiconductor device, to constitute a memory card. For example, the memory controller 2100 and the memory device 2200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 12:
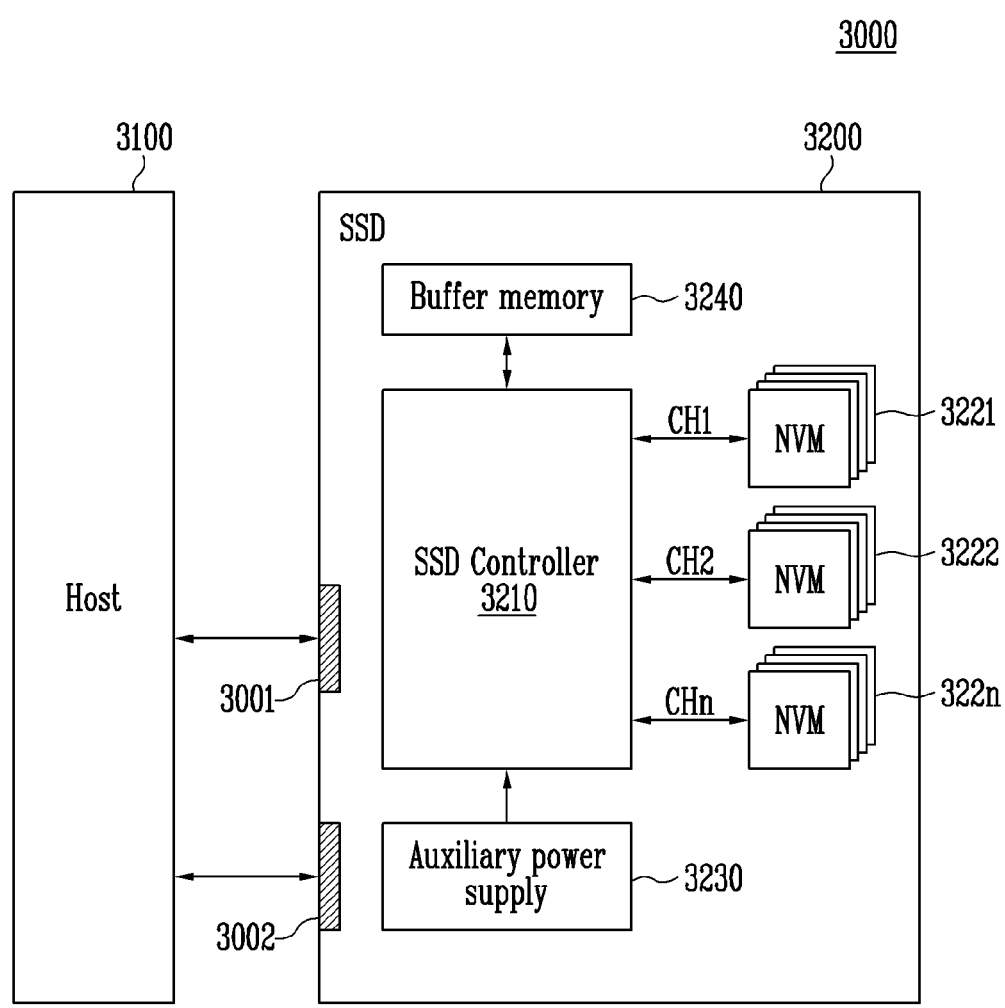
FIG. 12 is a block diagram illustrating a Solid State Drive (SDD) to which the storage device is applied in accordance with an embodiment of the disclosed technology.

FIG. 12 is a block diagram illustrating a Solid State Drive (SDD) to which the storage device is applied in accordance with an embodiment of the present disclosure.

Referring to FIG. 12, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322n, an auxiliary power supply 3230, and a buffer memory 3240.

In accordance with an embodiment of the present disclosure, the SSD controller 3210 may serve as the memory controller 200 described with reference to FIG. 1.

The SSD controller 3210 may control the plurality of flash memories 3221 to 322n in response to a signal SIG received from the host 3100. Exemplarily, the signal SIG may be a signal based on an interface between the host 3100 and the SSD 3200. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3230 is connected to the host 3100 through the power connector 3002. When the supply of power from the host 3100 is not smooth, the auxiliary power supply 3230 may provide power of the SSD 3200. Exemplarily, the auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 13:
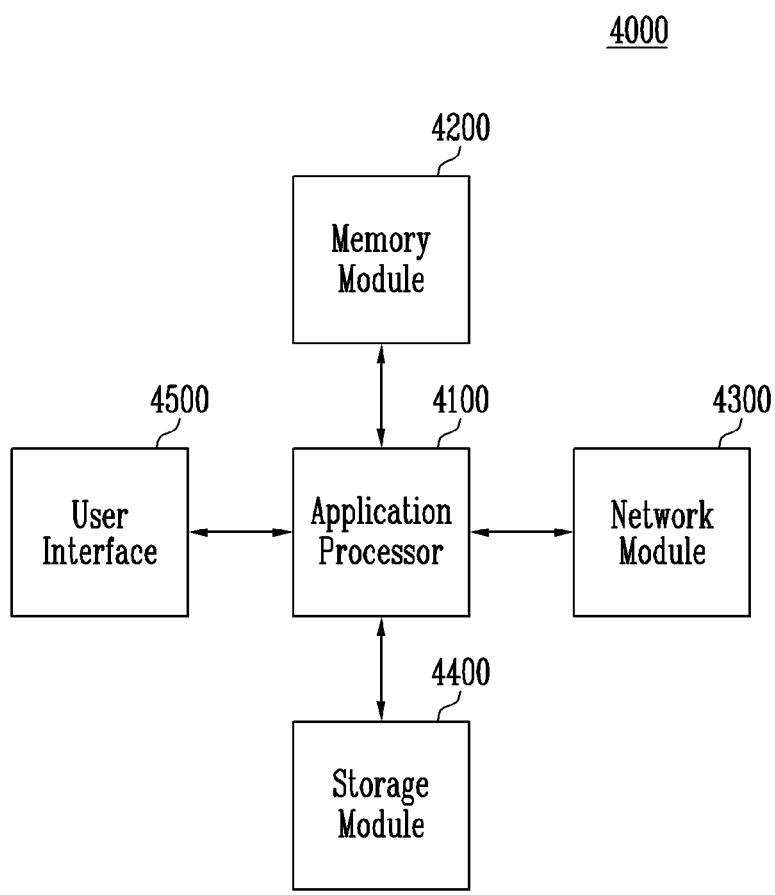
FIG. 13 is a block diagram illustrating a user system to which the storage device is applied in accordance with an embodiment of the disclosed technology.

FIG. 13 is a block diagram illustrating a user system to which the storage device is applied in accordance with an embodiment of the present disclosure.

Referring to FIG. 13, the user system 4000 includes an application processor 4100, a memory module 4200, a network module 4300, a storage module 4400, and a user interface 4500.

The application processor 4100 may drive components included in the user system 4000, an operating system (OS), a user program, or the like. Exemplarily, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. Exemplarily, the application processor 4100 and the memory module 4200 may be provided as one semiconductor package by being packaged based on a Package on Package (PoP).

The network module 4300 may communicate with external devices. Exemplarily, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. Exemplarily, the network module 4300 may be included in the application processor 4100.

The storage module 4400 may store data. For example, the storage module 4400 may store data received from the application processor 4100. Alternatively, the storage module 4400 may transmit data stored therein to the application processor 4100. Exemplarily, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. Exemplarily, the storage module 4400 may be provided as a removable drive such as a memory card of the user system 4000 or an external drive.

Exemplarily, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or commands to the application processor 4100 or outputting data to an external device. Exemplarily, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with some implementations of the disclosed technology, there can be provided a storage device having improved control of a peak power period and an operating method of the storage device.

While the disclosed technology has been shown and described with reference to certain exemplary embodiments thereof, it will be understood by those skilled in the art that various changes may be made.

The embodiments disclosed in this patent document are only examples to facilitate an understanding of the disclosed technology, and the disclosed technology is not limited thereto.

Various modifications and enhancements of the disclosed embodiments and other embodiments can be made based on what is disclosed in this patent document.

What is claimed is:

1. A storage device comprising:
 a plurality of memory devices; and
 a memory controller in communication with the plurality of memory devices through a plurality of channels, and
 wherein the memory controller is configured to select candidate channels to be activated among the plurality of channels, determine a threshold number of channel activation based on a number of channels in an active state before a first time point, and activate one or more target channels among the candidate channels so that a number of the target channels to be activated at the first time point is within the threshold number.

2. The storage device of claim 1, wherein the threshold number is a maximum number of channels to enter into the active state from an idle state at the same time point.

3. The storage device of claim 1, wherein the memory controller is further configured to update the threshold number at a second time point that a predetermined delay elapses from the first time point, based on a number of channels in the active state at before the second time point.

4. The storage device of claim 3, wherein the memory controller is further configured to compare the number of the candidate channels with the threshold number, and update the threshold number in response to a comparison result indicating that the number of the candidate channels is greater than the threshold number.

5. The storage device of claim 3, wherein the memory controller is further configured to activate at least one additional target channel at the second time point, the number of the at least one additional target channel being within an updated threshold number.

6. The storage device of claim 1, wherein the memory controller is further configured to store a reference table including the threshold number set based on a number of channels in the active state.

7. The storage device of claim 6, wherein the threshold number is differently set based on at least one of a size of data to be processed according to a command and an operation frequency of a channel.

8. The storage device of claim 1, wherein each of the plurality of channels is connected to at least one memory device among the plurality of memory devices, and
 wherein the memory controller is further configured to provide the command to a memory device connected to a channel in the active state among the plurality of channels.

9. A memory controller connected to a plurality of memory devices through a plurality of channels, the memory controller comprising:
 a storage configured to store a reference table including a channel activation threshold number that indicates a maximum number of channel activations occurring at a same time point and is set based on a number of channels in an active state; and
 an operation controller configured to identify a first threshold number based on the reference table and a number of channels in the active state before a first time point, select, among the plurality of channels, candidate channels through which a command is to be transmitted among the plurality of channels, and activate, at the first time point, at least one target channel among the candidate channels, the number of the at least one target channel activated being within the first threshold number.

10. The memory controller of claim 9, wherein the at least one target channel is configured to enter into the active state from an idle state at the first time point.

11. The memory controller of claim 9, wherein the storage is further configured to store the reference table including the channel activation threshold number that is set based on at least one of a size of data to be processed according to a command and an operation frequency of a channel.

12. The memory controller of claim 9, wherein the operation controller is further configured to identify a second threshold number based on a number of channels in the active state before a second time point that a predetermined delay elapses from the first time point.

13. The memory controller of claim 12, wherein the operation controller is further configured to activate at least one additional target channel at the second time point, the number of the at least one additional target channel being within the second threshold number.

14. The memory controller of claim 9, wherein the operation controller is further configured to provide the command to a memory device connected to the at least one target channel.

15. A method for operating a memory controller connected to a plurality of memory devices through a plurality of channels, the method comprising:
 selecting candidate channels through which a command is to be transmitted among the plurality of channels;
 setting a first channel activation threshold number for a first time point based on a reference table including channel activation threshold numbers, each channel activation threshold number set based on a number of channels in an active state before a corresponding channel activation time point; and activating one or more target channels among the candidate channels at the first time point, a number of the one or more target channels being within the first channel activation threshold number.

16. The method of claim 15, wherein the one or more target channels enter into the active state from an idle state at the first time point.

17. The method of claim 15, wherein the channel activation threshold numbers are set based on at least one of a size of data to be processed according to a command and an operation frequency of a channel.

18. The method of claim 15, further comprising:
identifying a second channel activation threshold number based on the reference table, the second threshold number set based on a number of channels in the active state before a second time point that a predetermined delay elapses from the first time point; and
activating at least one additional target channel at the second time point, the number of the at least one additional target channel being within the second channel activation threshold number.

19. The method of claim 18, wherein the identifying the second channel activation threshold number comprises:
comparing a number of the candidate channels with the first channel activation threshold number; and
identifying the second channel activation threshold number in response to a result of the comparing indicating that the number of the candidate channels is greater than the first threshold number.

20. The method of claim 15, further comprises providing a command or data to a memory device via an activated channel.

* * * * *